Figure 5:
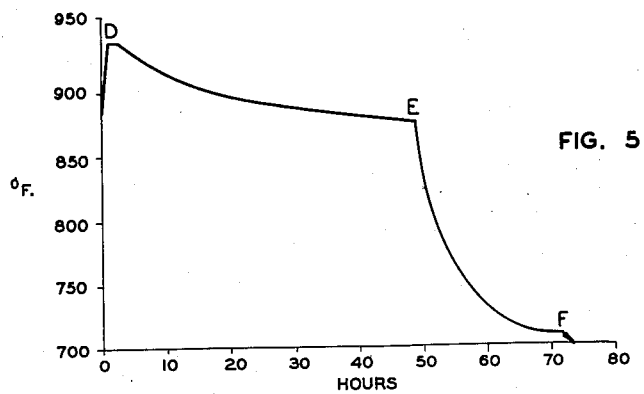

Sept. 16, 1952　　　　L. C. LIBERATORE　　　　2,610,445
METHOD OF STABILIZING THE MOLECULAR
ARRANGEMENT OF GLASS THERMOMETERS
Filed April 14, 1951　　　　　　　　　　3 Sheets-Sheet 1
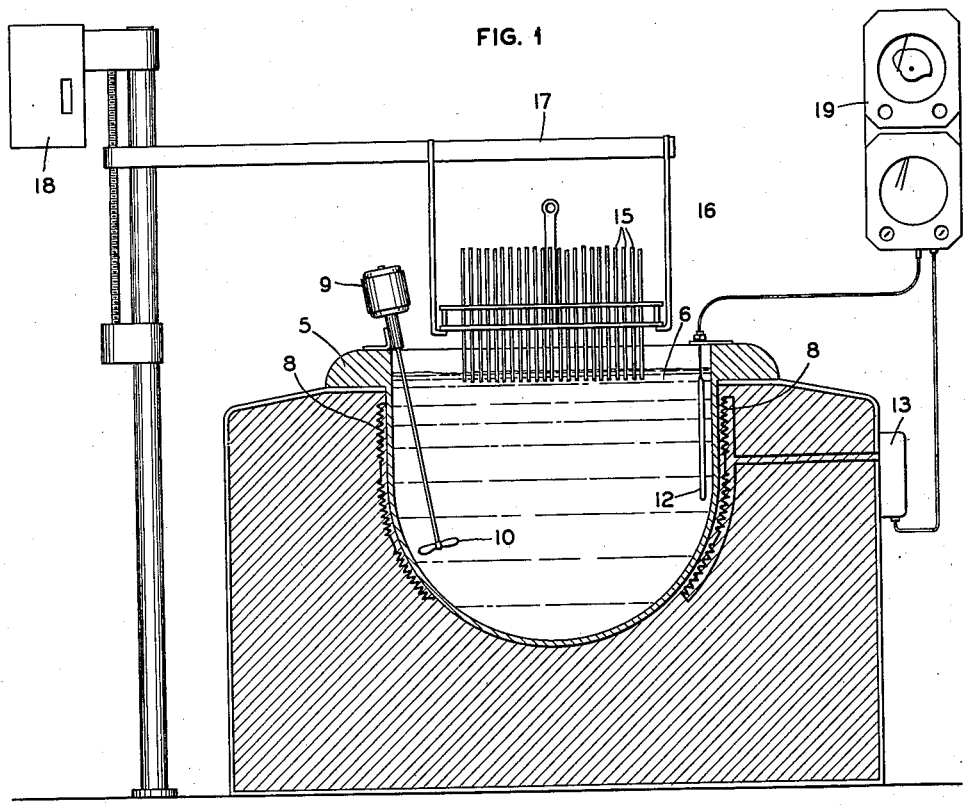
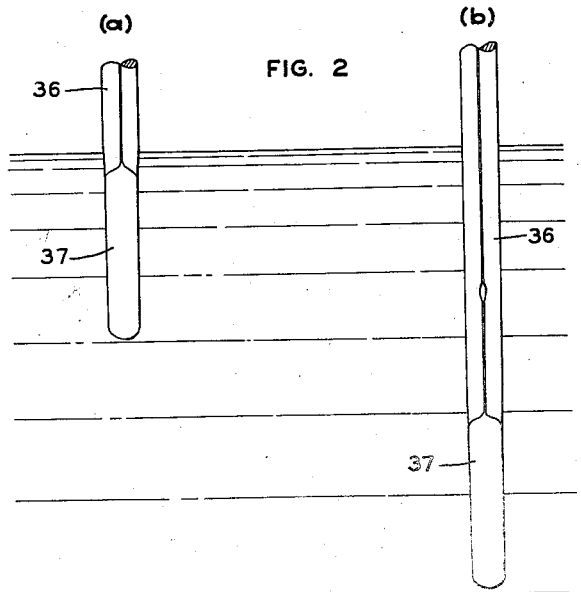
INVENTOR.
LAURENCE C. LIBERATORE
BY D. Clyde Jones
ATTORNEY

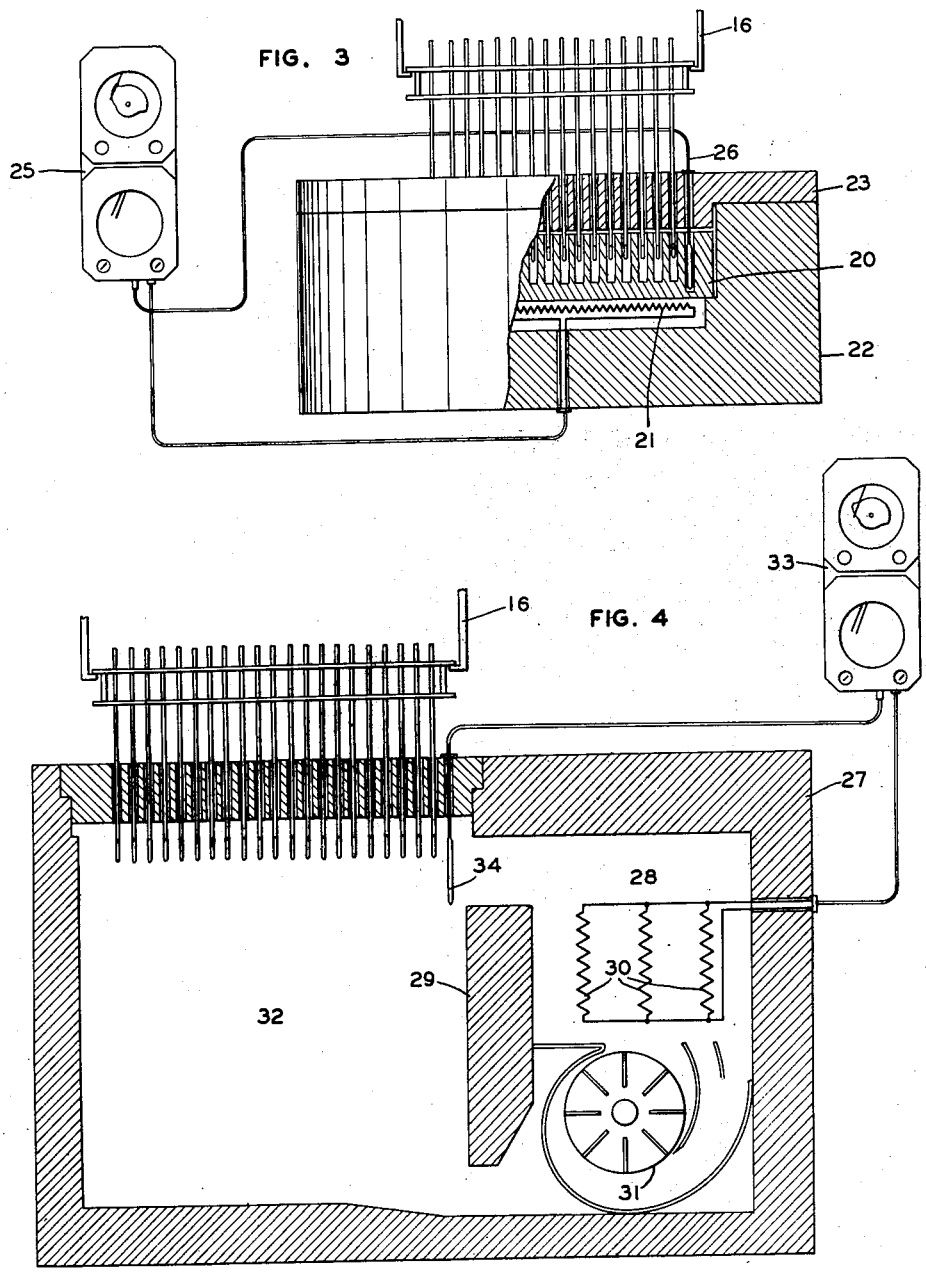

Sept. 16, 1952  L. C. LIBERATORE  2,610,445
METHOD OF STABILIZING THE MOLECULAR
ARRANGEMENT OF GLASS THERMOMETERS
Filed April 14, 1951  3 Sheets-Sheet 3

*INVENTOR.*
LAURENCE C. LIBERATORE
BY
D. Clyde Jones
ATTORNEY

Patented Sept. 16, 1952

2,610,445

UNITED STATES PATENT OFFICE 2,610,445

METHOD OF STABILIZING THE MOLECULAR ARRANGEMENT OF GLASS THERMOMETERS

Laurence C. Liberatore, Rochester, N. Y., assignor to Taylor Instrument Companies, Rochester, N. Y., a corporation of New York Application April 14, 1951, Serial No. 221,011

11 Claims. (Cl. 49—89)

This invention relates to a method of stabilizing the molecular arrangement of glass articles, such as thermometers, whereby a long period of "aging" or "seasoning" is obviated.

It is known in the annealing of glass, to heat glass articles to a relatively high point in the annealing range, bordering on the upper limit of the plastic state and the lower limit of the viscous state and there to maintain the temperature until all stresses and strains are removed, after which the temperature is rapidly lowered within the annealing range and held there long enough to remove reverse strains caused by the rapid drop in temperature. The annealing range in this connection means a zone of about 270° F. downwardly from the temperature at which all existing stresses and strains will be eliminated within two minutes after the glass is subjected thereto.

As summarized by Lillie and Shaver (U. S. Patent No. 2,148,630 and British Patent 479,631) a treatment which will remove these stresses and strains does not necessarily stabilize the glass article so that changes in molecular arrangement are minimized. For every temperature, glass has a certain preferred molecular arrangement. At temperatures well above the annealing point but below the melting point, this preferred molecular arrangement corresponds to an equilibrium arrangement which depends only on the temperature of the glass. The bonds between atoms are so loose that the molecular arrangement is able to change as quickly as the temperature regardless of the rapidity of the temperature changes. In the annealing range the time required to reach this preferred molecular arrangement increases, but at any temperature above the strain point this preferred molecular arrangement is substantially attained in a matter of hours. As the temperature is lowered below the strain point, the molecular arrangement of the glass becomes less and less mobile with the result that the time to reach the preferred molecular arrangement increases until, at temperatures well below the strain point, the viscosity of the glass is so great that the preferred molecular arrangement is never reached, and some other molecular arrangement exists which corresponds to a temperature higher than the temperature of the glass. The molecular arrangement existing in the glass at temperatures well below the strain temperature but at temperatures of service depends on the rate of cooling through the lower part of the annealing range and the temperature range from the strain point to as much as 75° F. below the strain point. If a glass is quickly chilled from some point above the annealing range to a point at least 75° F. below the strain point in a matter of minutes or less, it is obvious that the molecular arrangement "frozen" in the glass will resemble that corresponding to some temperature above the annealing range. If the glass is slowly cooled through the lower part of the annealing range and beyond to some temperature approximately 75° F. below the strain point in such a manner that the change in molecular arrangement does not lag far behind the change in temperature, the final molecular arrangement will be more nearly like the preferred molecular arrangement at the temperature 75° F. below the strain point.

In the temperature range of service which lies below the temperatures mentioned above there are forces existent tending to change the molecular arrangement to that corresponding to the temperature at which the article is used. The more similar the molecular arrangement at the temperature of service is to the preferred molecular arrangement, the smaller will be these forces and the smaller will be the change in molecular arrangement during service. Thus the glass quickly chilled from a temperature well above the annealing point will undergo a greater change in service, particularly at high service temperatures, than the glass which was slowly cooled through the temperature interval beginning in the annealing range and extending to approximately 75° F. below the strain point.

It is also apparent that in order to achieve the same degree of stabilization in several samples, whose molecular arrangement may vary from that corresponding to the chilled condition to that corresponding to the slowly cooled condition, in other words with different "thermal histories," it is only necessary to hold these samples at a temperature above the strain point for a period of time sufficient to reach the preferred molecular arrangement corresponding to that temperature and then cool the samples in the same manner following the cooling schedule necessary to give the molecular arrangement desired before the article is put into service. In effect all samples are brought to the same molecular arrangement during the holding period at this temperature above the strain point. By cooling all samples in the same manner after the initial holding period, the same molecular arrangement is frozen in all the samples before they are put into service and uniformity of product is achieved regardless of the previous "thermal histories" of the glass samples.

It has been stated that, if a condition of molecular instability remains in a glass article, forces exist even in an annealed glass article tending to change the molecular arrangement to an arrangement more closely resembling the preferred molecular arrangement at the temperature of service. This results in changes in the physical properties of the glass, for example, density or specific volume. Such changes cause instruments of precision such as glass thermometers, although well annealed, to lose their calibration and impair their accuracy.

In the past, it has been necessary to "season" or "age" thermometers by many months of storage at or about room temperature after they have been fabricated but before they have been calibrated, in order to eliminate this instability. It is also known to maintain glass articles for a period of the order of several weeks at a temperature below the strain temperature of the glass but above the maximum temperature to which the article will be subjected in service. The strain temperature is well down in the annealing range, and the said period of heating below the strain temperature, is thus at a materially lower temperature for any given glass than the heating of the aforesaid proposed annealing at a high point in the annealing range which borders on the upper limit of the plastic state and the lower limit of the viscous state.

Lillie and Shaver, in the mentioned patents, proposed to stabilize the molecular arrangement of an annealed glass article by subjecting it to heat treatment which consists of initially bringing it to a temperature between the annealing and strain temperatures, followed by controlled gradual cooling to a temperature not more than a hundred degrees F. below the strain temperature, at which point it was held for a relatively short time such as from ten to twenty hours. This was followed by fairly rapid cooling to room temperature. The holding temperature below the strain temperature is substantially higher than the maximum temperature to which the article would be subjected in service.

Many glass articles such as thermometers are made of two or more different types of glass such as lead glass B for the stem and normal glass C for the bulb. The types of glass which are suitable, such as boro-silicate glass A, lead glass B and normal glass C, have compositions and characteristics indicated in the following table:

| Glass | A | B | C |
|---|---|---|---|
| $SiO_2$ | 81.0 | 61.9 | 68.8 |
| $B_2O_3$ | 13.0 | 0.2 | 2.3 |
| $Al_2O_3$ | 1.7 | 1.9 | 1.5 |
| $Na_2O$ | 4.4 | 10.9 | 14.7 |
| $CaO$ | | | 5.7 |
| $PbO$ | | 24.0 | |
| $ZnO$ | | | 7.0 |

| Glass | Softening Temperature, Degrees F. | Annealing Temperature, Degrees F. | Strain Temperature, Degrees F. | Expansion $\times 10^{-7}$ |
|---|---|---|---|---|
| A | 1,500.8 | 1,041.8 | 962.6 | 32 |
| B | 1,189.4 | 845.6 | 786.2 | 87 |
| C | 1,295.6 | 1,000.4 | 933.8 | 89 |

Strain point, as the term is used herein, is that condition at which the glass has a viscosity of $10^{14.6}$ poises and strain temperature is that temperature at which a glass attains the strain point viscosity.

Annealing point, as the term is used herein, is that condition at which the glass has a viscosity of $10^{13.4}$ poises and annealing temperature is that temperature at which a glass attains the annealing point viscosity.

Each type of glass requires a different heat treatment. In addition, a heat treatment that will stabilize the normal glass C of the bulb will soften the lead glass B of the stem to the degree that it will deform or warp. Even where the stem and bulb are both made of the same type of glass, the stem usually includes a light shield, made of so-called enamel, having different characteristics from those of the glass. Consequently, even in this instance, it may be necessary that the stem should be subjected to heat treatment at a lower temperature than that of the bulb, if warpage of the stem is to be avoided. However, if the bulb is properly stabilized, incomplete stabilization of the stem is not serious, since changes in calibration of a thermometer due to improper "aging" arise mainly from changes in the molecular arrangement of the glass bulb.

In accordance with the present invention a novel method of stabilizing the molecular arrangement of a glass article, such as a thermometer, is provided whereby warpage so prevalent as a result of practising former methods, is avoided. In the present method, the heat appropriate for stabilizing a given portion of the article, is localized thereat and is substantially withheld from those portions of the article for which it is inappropriate.

The invention will best be understood from the following description and claims when taken with the drawings in which:

Fig. 1 diagrammatically indicates means for utilizing this method;

Fig. 2 is an enlarged detail view of a portion of Fig. 1, particularly showing the amounts of immersion of the thermometer in two different stages of the method;

Figs. 3 and 4 diagrammatically illustrate other means for practising the invention; and Figs. 5, 6, 7 and 8 are graphs useful in explaining the invention.

The preferred apparatus to be utilized in performing the present invention includes an open-topped tank 5 of nickel or other material that is inert with respect to the molten liquid or bath 6 contained therein. This liquid must be capable of withstanding temperatures suitable for the glasses in question without deleterious effect on the glass such as etching the glass or changing the composition thereof and without deterioration of the liquid over a considerable period. Among the liquids suitable for use in the bath are the molten alkali nitrates, such as potassium nitrate or sodium nitrate although sodium nitrate has been found to be less stable than potassium nitrate. For commercial aging a bath made up of a mixture of 25% to 48% sodium nitrate and the remainder potassium nitrate has been found to be most suitable. The bath is heated by the electric heating coils 8 located in close relation to the walls of the tank, the coils and the tank being surrounded by suitable heat lagging material. A motor-driven agitator 9 has its blades 10 projecting into the bath so that the liquid comprising the bath will be circulated and thereby maintained at a uniform temperature at all points therein. The temperature of the bath is maintained in accordance with a given time-temperature schedule by a time cycle device 19. This device includes a thermosensitive element 12 which senses the temperature of the bath and actuates the device to control the adjustment of the rheostat 13. The adjustment of this rheostat governs the flow of current to the heater elements 8 so that the predetermined schedule of temperature, for example as set forth in the charts of Figs. 5, 6, 7 and 8 is maintained in the bath.

The unfilled thermometers 15 to be treated, are placed in a rack 16 with the joints between the bulbs and the stems of the respective thermometers in the same horizontal plane. This rack is carried by a horizontal arm 17 which is arranged to be lowered at a predetermined variable rate in accordance with a given program, by the program motor 18.

In the modified apparatus of Fig. 3, the bulbs of the several thermometers as well as the joints between the respective bulbs and stems thereof are contained in the holes in a metal block 20 conveniently referred to as an air bath. This block is heated according to a given time-temperature schedule, by the electrical heater 21. The block and the heater are contained in a receptacle 22 which may incorporate heat insulating material. The receptacle is provided with a cover 23 having holes therethrough to receive the stems of the several thermometers. The heater is governed by a time cycle device 25, similar to that referred to above, to provide a given time-temperature schedule within the block. In this instance the temperature in the block is sensed by a suitable thermosensitive element 26.

As shown in Fig. 4, a box type electric furnace 27 may be used for treating the thermometers. This furnace is provided with a heating chamber 28 at the right side of the partition 29. This chamber which constitutes an air bath includes a heater comprising the heating coils 30 and a fan 31 at the left of the partition. The program of temperatures is maintained by the time cycle device 33 which has its thermosensitive element 34 projecting into the chamber 32.

It will be understood that a rack 16 as well as horizontal arm 17 actuated by the program motor such as 18 as shown in Fig. 1 may be employed with the apparatus of Figs. 3 and 4.

In utilizing this invention in the manufacture of thermometers, the thermometer is first fabricated by attaching a stem 36 (Fig. 2), having a capillary bore and a suitable cross sectional shape, to a bulb 37, of proper dimensions for holding the thermo-responsive fluid. After fabrication, the unfilled thermometers are loaded into a suitable holder or rack 16 (Fig. 1) so that each thermometer is vertical and so that the bulb-stem joints of the thermometers all lie in the same horizontal plane. It is evident that with the use of a liquid heating medium the lengths of the bulbs of the thermometers may vary considerably. If the bulb stem joints of all the thermometers lie in the same horizontal plane, the bulbs will all get the same treatment regardless of length.

The loaded thermometer holder is transferred to the arm 17 of the positioning device. This device supports the thermometer holder in such a way that the thermometers can be lowered into the stirred liquid heating medium with all the bulb stem joints in a horizontal plane. In the case where the thermometer bulb consists of glass C and the stem consists of glass B, the stirred liquid medium is brought to 878° F. The thermometers are lowered into the liquid medium until the bulb-stem joints are just below the surface of the liquid medium as at $a$ in Fig. 2. The time schedule controller is started and the bulbs are subjected to the first part of the aging treatment shown by the portions D and E of the schedule illustrated in Fig. 5. It will be noted that the bulbs are held at the temperature D for a period sufficient to erase their thermal histories. During this treatment, only the bulbs and that part of the bulb-stem joint in the liquid medium are maintained at the temperature required to stabilize the bulb glass. The atmosphere above the liquid medium is substantially below the temperature of the liquid medium. This combined with the low heat conductivity in the stem glass results in a rapid temperature drop along the stem. Therefore the length of the stem glass at a temperature high enough to cause warping is too short for warping to occur. When the point E is reached, the treatment proceeds according to portion EF of the schedule shown in Fig. 5. At the point E the positioning device automatically lowers the thermometers into the liquid heating medium at such a rate that the immersion desired is obtained by the time the temperature has fallen to 800° F. This temperature is too low to cause warping of the stems. The positioning device automatically stops further immersion and the thermometers are subjected to the remaining heat treatment at this immersion. Since 786.2° F. is the strain point of the stem glass, it is seen that the lower portion of the stem adjacent to the bulb has had time to substantially reach the preferred molecular configuration corresponding to 800° F. The subsequent heat treatment now stabilizes the lower part of the stem. During immersion the temperature does not rise sufficiently to cause warpage of the stem, yet does rise to the point where the stabilizing heat treatment applicable to the stem may be started. When the point F in the schedule shown in Fig. 5 is reached, the temperature remains fixed until the operator removes the thermometers and resets the time schedule controller for another batch of thermometers.

The procedure given for thermometers of bulb glass C and stem glass B may be applied to any other case where the bulb glass requires treatment over a temperature range higher than that for the stem glass. It is only necessary to use the appropriate temperature-time curves for the particular glasses involved.

Figure 7:
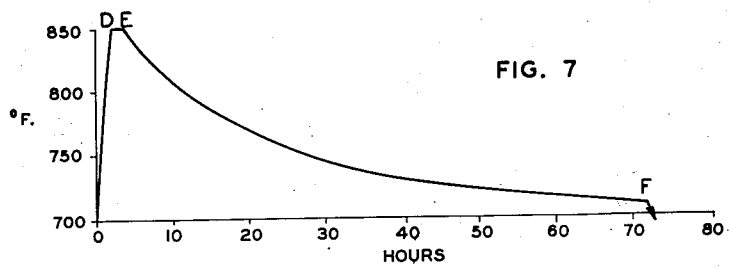
Figure 8:
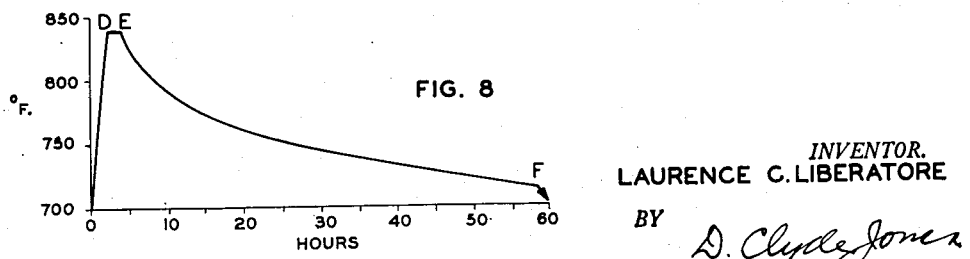

In the case that the bulb 37 and stem 36 consist of the same glass, it is only necessary to use the appropriate temperature-time curve for the particular glass from which the thermometer is made. If the thermometer is made of glass B (lead) the stirred liquid medium is brought to the temperature at which treatment starts, 850° F. (Fig. 7). The bulbs are lowered into the stirred liquid medium until the bulb stem joints are just below the surface of the salt as at $a$ in Fig. 2. They are held there through the portion DE of the schedule illustrated in Fig. 7. When the point E is reached the temperature falls along EF. At point E, the positioning device automatically lowers the thermometers into the salt bath at such a rate that the immersion desired is obtained by the time the salt temperature reaches 800° F. The positioning device automatically stops and the thermometers are subjected to the remaining heat treatment at this immersion. The schedule of Fig. 8 is also applicable to thermometers made of glass B (lead). Again the treatment for thermometers made of glass C may be applied to thermometers made of any other glass. It is only necessary to use the appropriate temperature-time curve for the particular glass.

Figure 6:
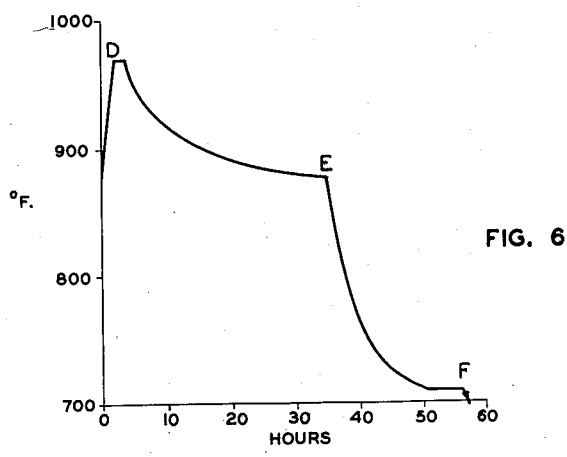

The time-temperature schedule of Figs. 5 and 6 will give approximately the same results with respect to stabilization of a thermometer having bulb glass C and stem glass B. A series of similar curves with sections DE lying between that shown in Fig. 5 and that shown in Fig. 6 are commercially practical without requiring an unduly lengthened treating period. It will be noted that section DE of Fig. 6 starts at 970° F. and requires 33 hours and it will also be noted that section DE of Fig. 5 starts at 940° F. and requires 48 hours. It will be seen as the starting temperature drops from 970° F. to 940° F. the time required increases correspondingly from 33 hours to 48 hours.

The present method can be practiced by using either of the types of equipment shown in Figs. 3 and 4 wherein heated air baths are employed, instead of the liquid bath as set forth above. In using an air bath substantially the same steps are followed as with the use of a liquid bath.

This application is a continuation in part of applicant's copending application Serial No. 770,150, filed August 22, 1947, now abandoned.

What I claim is:

1. The method of stabilizing the molecular arrangement of a glass thermometer including a stem of a glass having a given annealing range and a bulb of another glass having a higher annealing range joined thereto which comprises subjecting the bulb and its junction with said stem only, to heat treatment consisting of initially heating the mentioned bulb and junction to a given temperature between the annealing and strain temperatures thereof for a period of time of sufficient duration to substantially effect molecular stabilization of the glass at the given temperature followed by controlled gradual cooling for several hours to a temperature value of as much as seventy-five degrees F. below the strain temperature of the bulb glass, but substantially higher than the maximum temperature to which the thermometer will be subjected in service, subjecting an increased portion of said stem and the bulb to a temperature above the strain point of the stem glass, subjecting the increased portion of said stem and bulb to controlled gradual cooling to as much as 75° F. below the strain point of the stem glass, and then fairly rapidly cooling the stem and bulb to room temperature.

2. The method of stabilizing the molecular arrangement of a glass thermometer including a stem of a glass having a given annealing range and a bulb of another glass having a higher annealing range joined thereto, which comprises immersing said bulb and its junction to said stem only, in a bath heated to a given temperature above the strain point of the glass of the bulb for a period of time of sufficient duration to substantially effect molecular stability of the bulb glass at the given temperature, then gradually cooling the bath to a temperature value below the strain point of the bulb glass but above the maximum temperature to which the bulb will be subjected in service, continuing to immerse the bulb and immersing an increased portion of the stem in the bath at the same time bringing the bath to a temperature above the strain point of the stem glass, gradually cooling the bath to a temperature of as much as 75° F. below the strain temperature of the glass in the stem while the mentioned portion of the thermometer is immersed therein, and removing the thermometer from the bath to reduce the temperature of the thermometer to room temperature.

3. The method of stabilizing the molecular arrangement of a glass thermometer having a normal glass bulb joined to a lead glass stem, the glass of the bulb being able to withstand substantially higher temperature than the glass of the stem without softening, which comprises heating only said bulb and its junction with said stem to a given temperature in the range from 940° F. to 970° F. which is above the strain temperature of the bulb glass, for a maximum period of five hours until the molecular stabilization of the bulb glass as the given temperature is substantially reached, followed by gradually reducing the temperature of the bulb and its juncture with the stem through a maximum period of fifty hours to an intermediate temperature of 870° F. which is below the strain temperature of the bulb glass but above the strain temperature of the stem glass and above the maximum temperature to which the thermometer will be subjected in service, subjecting the bulb and an increased portion of the stem to a temperature near but above the strain point of the stem glass, cooling the bulb and the increased portion of the stem glass over a period of 20 hours to a temperature of as much as 75° F. below the strain point of the stem glass, and promptly reducing the temperature of the thermometer to room temperature.

4. The method as defined in claim 2 wherein the bath comprises an air bath.

5. The method as defined in claim 2 wherein the liquid bath comprises a molten alkali nitrate.

6. The method as defined in claim 2 wherein the bath comprises molten potassium nitrate.

7. The method as defined in claim 2 wherein the bath comprises a molten mixture of 25% to 48% sodium nitrate and the remainder potassium nitrate.

8. The method of stabilizing the molecular arrangement of a portion of a glass thermometer including a stem and a bulb joined thereto which comprises suspending the thermometer with the principal axis of the stem extending vertically and with the bulb projecting downward, subjecting a portion only of the thermometer including the bulb and at least the junction of the bulb with the stem to localized heating to a given temperature above the strain point of the glass of the bulb for a period of sufficient duration to effect molecular stabilization of the bulb glass at the given temperature while the remainder of the stem is maintained below the warping temperature thereof, progressively reducing the localized heat applied to the mentioned portion of the thermometer, to a temperature value of as much as 75° F. below the strain temperature of the bulb glass, and removing the thermometer from the localized heat to reduce the temperature of the thermometer to room temperature.

9. The method of stabilizing the molecular arrangement of a portion of a glass thermometer including a stem and a bulb joined thereto which comprises suspending the thermometer with the principal axis of the stem extending vertically and with the bulb projecting downward, subjecting a portion only of the thermometer including the bulb and at least the junction of the bulb with the stem to localized heating to a given temperature above the strain point of the glass of the bulb for a period of sufficient duration to effect molecular stabilization of the bulb glass at the given temperature while the remainder of the stem is maintained below the warping temperature thereof, gradually reducing the localized heat applied to the mentioned portion of the thermometer, and removing the thermometer from the localized heat to reduce the temperature of the thermometer to room temperature.

10. The method of stabilizing the molecular arrangement of a glass thermometer including a stem and a bulb joined thereto which comprises immersing a part of the thermometer including said bulb and a portion only of the stem in the region of its junction to said bulb, in a molten salt bath heated to a given temperature above the strain point of the glass of the bulb for a period of time of sufficient duration to substantially effect molecular stabilization of the bulb glass at the given temperature, while the remainder of the stem remains at temperature conditions such that warping thereof will not take place, progressively cooling the bath to a temperature value of as much as 75° F. below the strain temperature of the bulb glass, and removing the thermometer from the bath to reduce the temperature of the thermometer to room temperature.

11. The method of stabilizing the molecular arrangement of a glass thermometer including a stem and a bulb joined thereto which comprises immersing said bulb and a portion only of the stem in the region of its junction to said bulb, in a bath heated to a given temperature above the strain point of the glass of the bulb for a period of time of sufficient duration to substantially effect molecular stabilization of the bulb glass at the given temperature while the remainder of the stem remains at a temperature below the warping temperature of the stem, gradually cooling the bath to a temperature value below the strain temperature of the bulb glass, and removing the thermometer from the bath to reduce the temperature of the thermometer to room temperature.

LAURENCE C. LIBERATORE.

REFERENCES CITED

The following references are of record in the file of this patent:

UNITED STATES PATENTS

| Number | Name | Date |
|---|---|---|
| 2,148,630 | Lillie et al. | Feb. 28, 1939 |